(12) United States Patent
Sugimoto

(10) Patent No.: US 11,072,239 B2
(45) Date of Patent: Jul. 27, 2021

(54) VEHICLE DISPLAY CONTROL DEVICE

(71) Applicant: Yazaki Corporation, Tokyo (JP)

(72) Inventor: Terumitsu Sugimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/361,899

(22) Filed: Mar. 22, 2019

(65) Prior Publication Data

US 2019/0291580 A1     Sep. 26, 2019

(30) Foreign Application Priority Data

Mar. 26, 2018   (JP) .............................. JP2018-058333

(51) Int. Cl.
*B60K 37/06*        (2006.01)
*G06F 3/14*         (2006.01)
(Continued)

(52) U.S. Cl.
CPC .............. *B60K 37/06* (2013.01); *B60K 35/00* (2013.01); *B62D 1/06* (2013.01); *G06F 3/04886* (2013.01); *G06F 3/14* (2013.01); *B60K 2370/139* (2019.05); *B60K 2370/141* (2019.05); *B60K 2370/143* (2019.05);
(Continued)

(58) Field of Classification Search
CPC ....... G06F 3/04886; G06F 3/14; B60K 37/06; B60K 35/00; B60K 2370/48; B60K 2370/782; B60K 2370/1446; B60K 2370/143; B60K 2370/349; B60K 2370/139; B60K 2370/197; B60K 2370/736; B60K 2370/141; B60K 2370/52; B60K 2370/1442; B62D 1/06
See application file for complete search history.

(56) References Cited

U.S. PATENT DOCUMENTS

2013/0076499 A1* 3/2013 Okita ................... B60K 35/00
                                                                340/438
2015/0353006 A1* 12/2015 Jolda ................... B60K 37/02
                                                                315/77
(Continued)

FOREIGN PATENT DOCUMENTS

JP           4-132125 A       5/1992
JP          2005-62978 A      3/2005
(Continued)

*Primary Examiner* — Amare Mengistu
*Assistant Examiner* — Jennifer L Zubajlo
(74) *Attorney, Agent, or Firm* — Sughrue Mion, PLLC

(57) ABSTRACT

A vehicle display control device, when a steering wheel is at a steering angle position of a neutral position or the vicinity thereof, if a right hand sensor detects gripping of the steering wheel, turns off light sources of memory buttons and operation buttons that can be operated with a right hand, and if a left hand sensor detects the gripping, turns off a light source of air conditioning related buttons and hides touch buttons of a touch panel display that can be operated with a left hand. The vehicle display control device, if the right hand sensor does not detect the gripping, turns on the light sources of the memory buttons and the operation buttons, and if the left hand sensor does not detect the gripping, turns on the light source of the air conditioning related buttons and displays the touch buttons on the touch panel display.

6 Claims, 5 Drawing Sheets

(51) Int. Cl.
*G06F 3/0488* (2013.01)
*B60K 35/00* (2006.01)
*B62D 1/06* (2006.01)

(52) U.S. Cl.
CPC ............... *B60K 2370/1442* (2019.05); *B60K 2370/1446* (2019.05); *B60K 2370/197* (2019.05); *B60K 2370/349* (2019.05); *B60K 2370/48* (2019.05); *B60K 2370/52* (2019.05); *B60K 2370/736* (2019.05); *B60K 2370/782* (2019.05)

(56) References Cited

U.S. PATENT DOCUMENTS

| | | | | |
|---|---|---|---|---|
| 2017/0101111 | A1* | 4/2017 | Fung | B60W 50/14 |
| 2017/0282715 | A1* | 10/2017 | Fung | B62D 1/04 |
| 2018/0326851 | A1* | 11/2018 | Kim | G06F 3/0488 |

FOREIGN PATENT DOCUMENTS

| | | | |
|---|---|---|---|
| JP | 2011-255877 A | 12/2011 | |
| JP | 2012-1128 A | 1/2012 | |

\* cited by examiner

VEHICLE DISPLAY CONTROL DEVICE

CROSS REFERENCE TO RELATED APPLICATION

The present application is based on, and claims priority from Japanese Patent Application No. 2018-058333, filed Mar. 26, 2018, the disclosure of which is hereby incorporated by reference herein in its entirety.

TECHNICAL FIELD

The present application relates to a device for controlling a display mode of an operation unit operated by a driver of a vehicle.

BACKGROUND ART

Various input buttons operated by an occupant are provided in a vehicle. To enhance visibility of an input button by the occupant, the input button is illuminated.

The number and types of the input buttons provided on the vehicle are increasing with diversification of equipment and functions installed in the vehicle. For this reason, the occupant cannot instantly distinguish which input button should be operated, by merely increasing the visibility by illuminating the input button.

A technique has therefore been devised in which depending on the use frequency of a button (switch) on a display screen, a display mode is changed such as the size and brightness of the button (see JP 2005-062978 A1), or brightness is adjusted of a light source for illuminating an operation surface of the input button from behind (see JP 2012-001128 A1).

SUMMARY

In the above-described conventional technique, since the visibility of the input button is adjusted depending on the use frequency by the occupant, the visibility of the input button is different depending on the level of the use frequency.

The present application has been made in view of the above circumstances, and an object of the present application is to provide a vehicle display control device capable of controlling a display mode of an operation unit operated by a driver of a vehicle for a purpose other than driving so that it is easy to distinguish between an operation unit that may be operated by a hand by which operation is more easily performed and an operation unit that is not so.

To achieve the above object, a vehicle display control device according to an aspect of the present application includes: a detection unit for detecting an operation state by a driver of a driving operation unit operated for driving of a vehicle, individually for a right hand and a left hand of the driver; a right hand side control unit capable of displaying a right hand side operation unit operated with the right hand of the driver for a purpose other than driving of the vehicle in a first display mode when the operation state by the right hand of the driver detected by the detection unit is in an operating state, and displaying the right hand side operation unit in a second display mode higher in visibility by the driver than the first display mode when the operation state by the right hand of the driver detected by the detection unit is in a non-operating state; and a left hand side control unit capable of displaying a left hand side operation unit operated with the left hand of the driver for a purpose other than driving of the vehicle in the first display mode when the operation state by the left hand of the driver detected by the detection unit is in an operating state, and displaying the left hand side operation unit in the second display mode when the operation state by the left hand of the driver detected by the detection unit is in a non-operating state.

Thus, the driver when operating the driving operation unit with the right hand cannot operate the right hand side operation unit with the right hand unless operation of the driving operation unit with the right hand is stopped. At this time, even if the right hand side operation unit is displayed in a display mode in which it is visually recognized more easily, it is useless for the driver operating the driving operation unit with the right hand.

Similarly, the driver when operating the driving operation unit with the left hand cannot operate the left hand side operation unit with the left hand unless operation of the driving operation unit with the left hand is stopped. At this time, even if the left hand side operation unit is displayed in a display mode in which it is visually recognized more easily, it is useless for the driver operating the driving operation unit with the left hand.

On the contrary, the driver when not operating the driving operation unit with the right hand may operate the right hand side operation unit with the right hand. At this time, if the right hand side operation unit is displayed in a display mode in which it is visually recognized more easily, the driver can easily find the right hand side operation unit when the right hand side operation unit is to be operated with the right hand, which is convenient for the driver.

Similarly, the driver when not operating the driving operation unit with the left hand may operate the left hand side operation unit with the left hand. At this time, if the left hand side operation unit is displayed in a display mode in which it is visually recognized more easily, the driver can easily find the left hand side operation unit when the left hand side operation unit is to be operated with the left hand, which is convenient for the driver.

For this reason, when the driver does not operate the driving operation unit with the right hand or the left hand, the right hand side operation unit or the left hand side operation unit is displayed in the second display mode higher in visibility than the first display mode of when the driver operates the driving operation unit, whereby the display mode of the operation unit operated by the driver of the vehicle for the purpose other than driving can be controlled so that it is easy to distinguish between the operation unit that may be operated by the hand by which operation is more easily performed and the operation unit that is not so.

The detection unit may include a grip sensor for individually detecting a gripping state by the driver of a steering wheel as the driving operation unit at time of not making a right or left turn, at which a steering angle is less than or equal to a predetermined value, by dividing the gripping state into a gripping state of a right hand gripping range by the right hand and a gripping state of a left hand gripping range by the left hand.

Thus, when the vehicle does not make a right or left turn and the steering angle of the steering wheel is less than or equal to the predetermined value, the right hand gripping range of the steering wheel is not gripped by the left hand of the driver, and the left hand gripping range is not gripped by the right hand.

For this reason, when the steering angle of the steering wheel is less than or equal to the predetermined value, if the right hand gripping range of the steering wheel is not gripped, the driver has released the right hand from the steering wheel, and if the left hand gripping range of the steering wheel is not gripped, the driver has released the left hand from the steering wheel.

When the steering angle of the steering wheel is less than or equal to the predetermined value, if the right hand gripping range of the steering wheel is not gripped, the display mode of the right hand side operation unit is therefore changed from the first display mode to the second display mode. Thus, when there is a possibility that the driver operates the right hand side operation unit with the right hand, the visibility of the right hand side operation unit can be improved.

Similarly, when the steering angle of the steering wheel is less than or equal to the predetermined value, if the left hand gripping range of the steering wheel is not gripped, the display mode of the left hand side operation unit is changed from the first display mode to the second display mode. Thus, when there is a possibility that the driver operates the left hand side operation unit with the left hand, the visibility of the left hand side operation unit can be improved.

Each of the right hand side operation unit and the left hand side operation unit may include a push button to which the driver performs pressing operation. In this case, each of the right hand side control unit and the left hand side control unit make brightness of illumination by a light source on an operation surface of the push button stronger in the second display mode than in the first display mode.

Brightness of the operation surface of the push buttons of the right hand side operation unit and the left hand side operation unit is set higher when the right hand side operation unit and the left hand side operation unit can be operated respectively with the right hand and the left hand than when they cannot be operated, whereby it is possible to make it easy to distinguish only the push button of the operation unit that can be operated by the driver by brightness of its display surface.

At least one operation unit of the right hand side operation unit and the left hand side operation unit may include a display button that is selectively displayed on a touch panel and to which the driver performs contact operation during display. In this case, a control unit corresponding to the at least one operation unit of the right hand side control unit and the left hand side control unit does not display the display button on the touch panel in the first display mode, and displays the display button on the touch panel in the second display mode.

Thus, only when the right hand side operation unit and the left hand side operation unit can be operated respectively with the hands by which operation is more easily performed, the display button is displayed of the operation unit that can be operated with the hand by which operation is more easily performed. When it is not possible to operate with the hand by which operation is more easily performed, the display button is not displayed of the operation unit that cannot be operated with the hand by which operation is more easily performed. Thus, it is possible to easily find only the display button of the operation unit that can be operated by the driver with the hand by which operation is more easily performed.

With the vehicle display control device according to the aspect of the present application, the display mode of the operation unit operated by the driver of the vehicle for the purpose other than driving can be controlled so that it is easy to distinguish between the operation unit that may be operated by the hand by which operation is more easily performed and the operation unit that is not so.

DETAILED DESCRIPTION

Hereinafter, a vehicle display control device according to an embodiment will be described with reference to the drawings.

Figure 1:
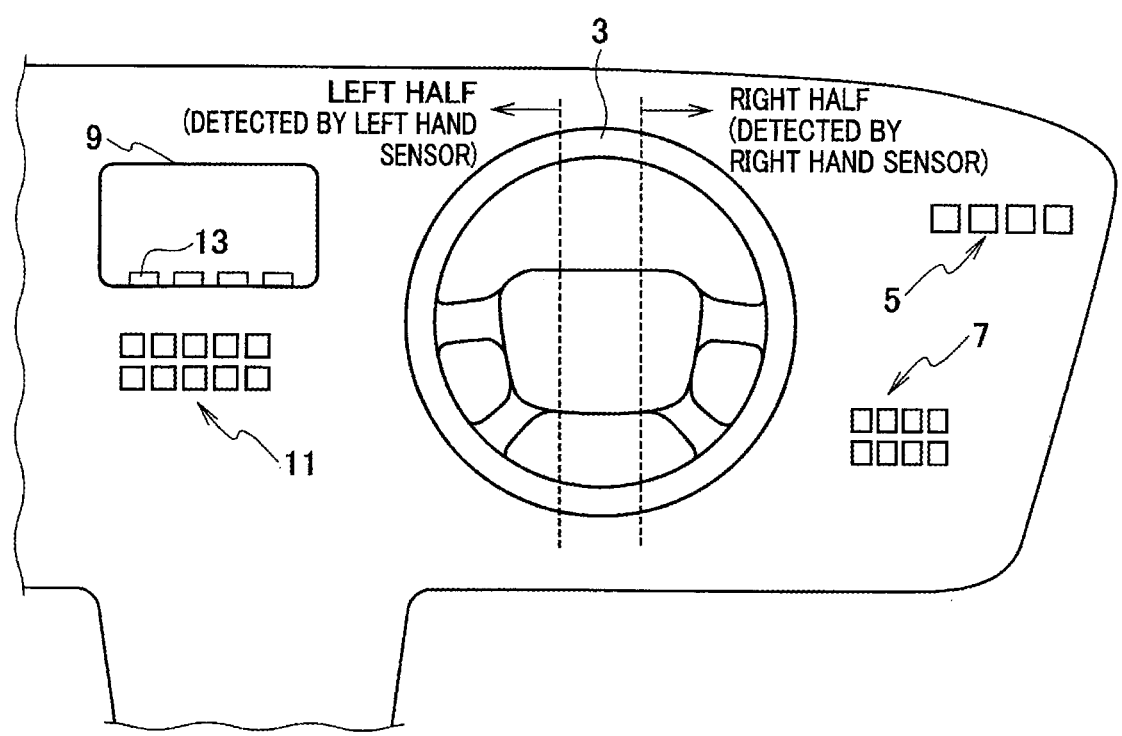
FIG. 1 is an explanatory diagram illustrating an arrangement of buttons and the like around an instrument panel of a vehicle in which display modes are controlled by a vehicle display control device according to an embodiment.

As illustrated in FIG. 1, on an instrument panel of a vehicle, buttons and the like operated by a driver for a purpose other than driving are arranged on the left and right sides of a steering wheel (driving operation unit) 3. Note that, FIG. 1 illustrates a case of a right hand drive vehicle (a vehicle whose driver's seat is a right front seat). Thus, in a case of a left hand drive vehicle (a vehicle whose driver's seat is a left front seat), the arrangement of the buttons and the like of the left and right sides of the steering wheel 3 is reversed.

In the vehicle illustrated in FIG. 1, on the right side of the steering wheel 3, for example, right hand side operation units are arranged such as memory buttons 5 and operation buttons 7.

The memory buttons 5 are buttons for executing operations of functions registered in advance when operated. The memory buttons 5 include, for example, a seat button for returning a seat and a backrest of a driver's seat to a driving position stored in advance, a mirror button for moving an interior mirror and door mirrors to mirror surface angles matching the driving position, and the like.

The operation buttons 7 include, for example, an engine start button, a door mirror angle adjustment button, a fog lamp auto lighting button, an anti-lock brake system on/off button, and the like.

Figure 2:
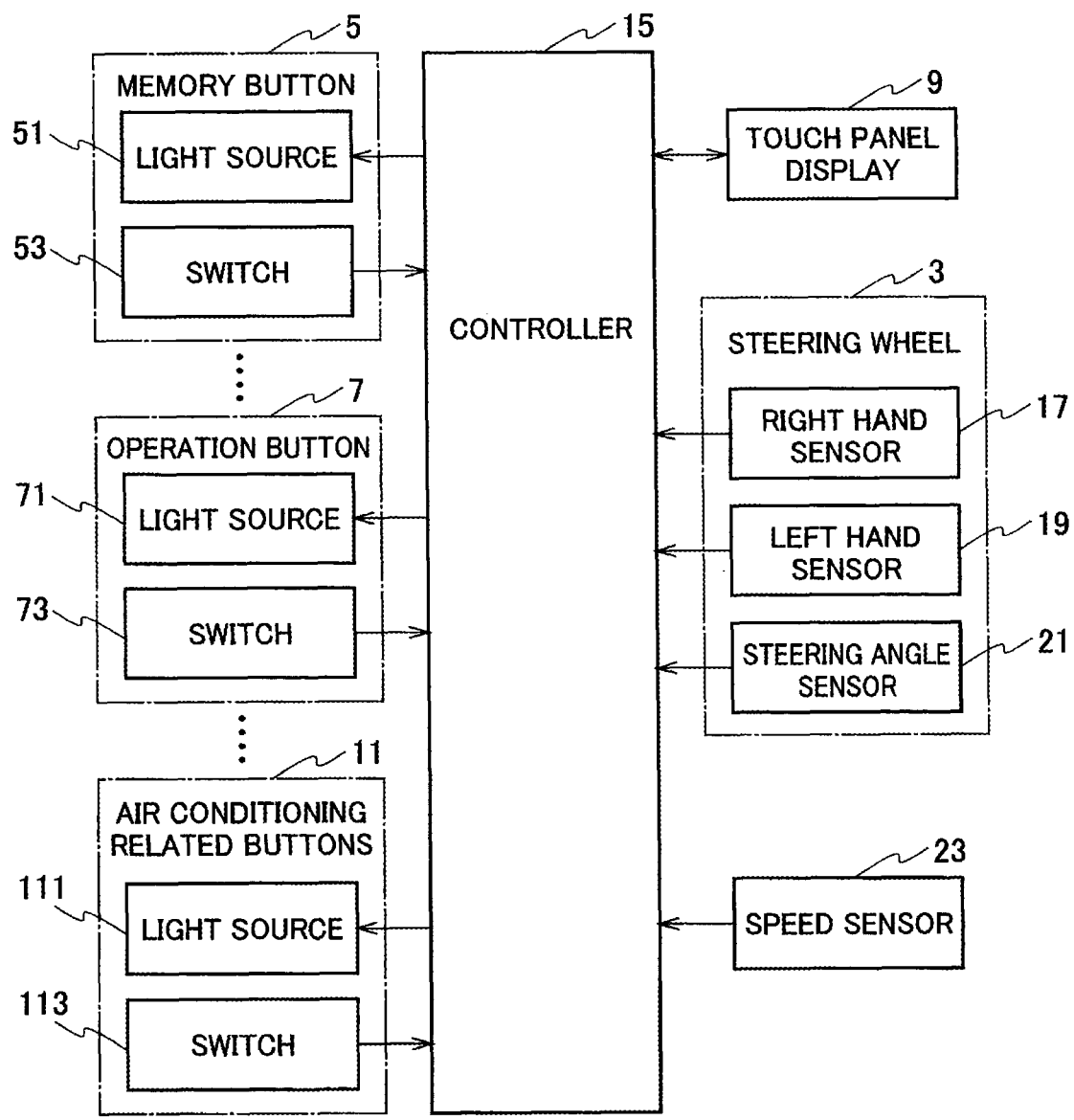
FIG. 2 is an explanatory diagram schematically illustrating a schematic configuration of the display control device according to the embodiment for performing lighting control and display control of the buttons and the like illustrated in FIG. 1.

In the embodiment, the memory buttons 5 and the operation buttons 7 can be visually recognized easily by illumination of their operation surfaces by turning on of light sources 51, 71 incorporated (see FIG. 2).

In the vehicle illustrated in FIG. 1, a touch panel display 9 (touch panel) of a car navigation system, air conditioning related buttons 11, and the like are arranged on a center console on the left side of the steering wheel 3.

The touch panel display 9 displays a guide map and the like of car navigation, as well as touch buttons (display buttons) 13 for inputting various settings. The touch buttons 13 are multi-function buttons by which an assigned function operates by touch operation, and corresponds to a left hand side operation unit. The touch buttons 13 include, for example, a mode selection button for selecting an operation mode, a destination setting button for inputting a destination, and the like.

The touch buttons 13 can change a display position on the touch panel display 9, or switch display/non-display.

The air conditioning related buttons 11 as the left hand side operation unit include, for example, an air conditioning temperature setting button, an air flow setting button, a ventilation mode (inside air circulation/outside air introduction) switching button, and the like.

In the embodiment, similarly to the memory buttons 5 and the operation buttons 7, the air conditioning related buttons 11 can be visually recognized easily by illumination of their operation surfaces by turning on of a light source 111 incorporated (see FIG. 2).

As illustrated in FIG. 2, the vehicle display control device according to the embodiment includes a controller 15. The controller 15 controls lighting and extinction of illumination of the operation surfaces of the memory buttons 5, the operation buttons 7, and the air conditioning related buttons 11, and display and non-display of the touch buttons 13 of the touch panel display 9.

The controller 15 is connected to light sources 51, 71, 111 for illumination of the operation surfaces incorporated in the memory buttons 5, the operation buttons 7, and the air conditioning related buttons 11, via a signal wiring such as an in-vehicle LAN. The signal wiring is routed, for example, on the back side of an interior panel of the vehicle.

The controller 15 is connected to the switches 53, 73, 113 for detecting pressing operation of the memory buttons 5, the operation buttons 7, and, the air conditioning related buttons 11, via the signal wiring.

The controller 15 is connected to the touch panel display 9 via the signal wiring.

The controller 15 is connected to a right hand sensor 17 and a left hand sensor 19 as grip sensors for detecting gripping of the steering wheel 3 by the right hand and the left hand of the driver, via the signal wiring.

The controller 15 is connected to a steering angle sensor 21 for detecting a steering angle from the neutral position of the steering wheel 3 (a steering angle of the steering wheel 3 at which the vehicle goes straight), via the signal wiring.

The controller 15 is connected to a speed sensor 23 for outputting a speed pulse of a period corresponding to a traveling speed during traveling of the vehicle, via the signal wiring.

As illustrated in FIG. 1, the right hand sensor 17 has a detection area of a substantially right half (right hand gripping range), which is to be gripped by the right hand, of the steering wheel 3 at the neutral position, and the left hand sensor 19 has a detection area of a substantially left half (left hand gripping range), which is to be gripped by the left hand, of the steering wheel 3 at the neutral position. The right hand sensor 17 and the left hand sensor 19 each can be configured by, for example, a capacitive type sensor in which the distance between electrodes changes by gripping of the steering wheel 3.

The steering angle sensor 21 can be configured by, for example, a slip ring in which a rotor is mounted on the steering wheel 3 and a stator is attached to a steering shaft (not illustrated).

When one of the switches 53, 73, 113 detects pressing operation of the corresponding memory button 5, operation buttons 7, or air conditioning related button 11, the controller 15 causes operation of a function corresponding to the pressed memory button 5, operation buttons 7, or air conditioning related button 11 to be executed.

When touch operation of one of the touch buttons 13 is detected by the touch panel of the touch panel display 9, the controller 15 causes operation of a function corresponding to the touch button 13 to which the touch operation is performed to be executed.

When the steering wheel 3 is at a steering angle position of the neutral position or the vicinity the neutral position, the controller 15 performs lighting control of the light sources 51, 71, 111 and display control of the touch buttons 13 in the touch panel display 9 depending on a detection state of gripping of the steering wheel 3 by the right hand sensor 17 and the left hand sensor 19.

Note that, the steering angle position in the vicinity of the neutral position of the steering wheel 3 can be, for example, a range of a steering angle at which the driver can steer the steering wheel 3 without changing gripping of the right hand or the left hand (a steering angle less than or equal to a predetermined value). Thus, a steering angle position at the time of steering the steering wheel 3 by changing gripping of the right hand or the left hand such as a right or left turn, turning, or the like is not included in the range of the steering angle position in the vicinity of the neutral position of the steering wheel 3 at least.

Next, with reference to the flowchart of FIG. 3, a procedure will be described of the lighting control of the light sources 51, 71, 111 and the display control of the touch buttons 13 executed by a CPU of the controller 15 in accordance with a program stored in a ROM of the controller 15. The CPU repeatedly executes control of the procedure illustrated in the flowchart of FIG. 3 for each predetermined period.

First, the CPU confirms whether or not the vehicle is traveling (step S1). The fact that the vehicle is traveling can be confirmed by inputting of the speed pulse from the speed sensor 23.

When the vehicle is not traveling (NO in step S1), a series of processing steps is ended. On the other hand, when the vehicle is traveling (YES in step S1), the CPU confirms whether or not the steering wheel 3 is at the steering angle position of the neutral position or the vicinity of the neutral position (step S3).

When the steering wheel 3 is not at the steering angle position of the neutral position or the vicinity of the neutral position (NO in step S3), there is a possibility that the steering wheel 3 is being steered by changing gripping of the right hand or the left hand.

In this state, the gripping state of the right half of the steering wheel 3 detected by the right hand sensor 17 is not necessarily the gripping state by the right hand of the driver, and the gripping state of the left half of the steering wheel 3 detected by the left hand sensor 19 is not necessarily the gripping state by the left hand of the driver. For this reason, whether or not the driver grips the steering wheel 3 cannot be determined individually for each of the right hand and the left hand.

The CPU therefore turns off the light sources 51, 71, 111 and hides the touch buttons 13 of the touch panel display 9 (step S5), and then ends the series of processing steps.

On the other hand, when the steering wheel 3 is at the steering angle position of the neutral position or the vicinity of the neutral position (YES in step S3), it can be considered that the gripping state of the right half of the steering wheel 3 detected by the right hand sensor 17 is the gripping state by the right hand of the driver, and the gripping state of the left half of the steering wheel 3 detected by the left hand sensor 19 is the gripping state by the left hand of the driver.

The CPU therefore confirms whether or not the right hand sensor 17 detects gripping of the right half of the steering wheel 3 (step S7). When the right hand sensor 17 detects the gripping (YES in step S7), the CPU turns off the light sources 51, 71 of the memory buttons 5 and the operation buttons 7 arranged on the right side of the steering wheel 3 (step S9), and proceeds to step S13.

When the right hand sensor 17 does not detect the gripping (NO in step S7), the CPU turns on the light sources 51, 71 of the memory buttons 5 and the operation buttons 7 (step S11), and then proceeds to step S13.

In step S13, the CPU confirms whether or not the left hand sensor 19 detects gripping of the left half of the steering wheel 3. When the left hand sensor 19 detects the gripping (YES in step S13), the CPU hides the touch buttons 13 of the touch panel display 9 arranged on the left side of the steering wheel 3, and turns off the light source 111 of the air conditioning related buttons 11 (step S15), and then ends the series of processing steps.

When the left hand sensor 19 does not detect the gripping (NO in step S13), the CPU displays the touch buttons 13 on the touch panel display 9, and turns on the light source 111 of the air conditioning related buttons 11 (step S17), and then ends the series of processing steps.

Figure 3:
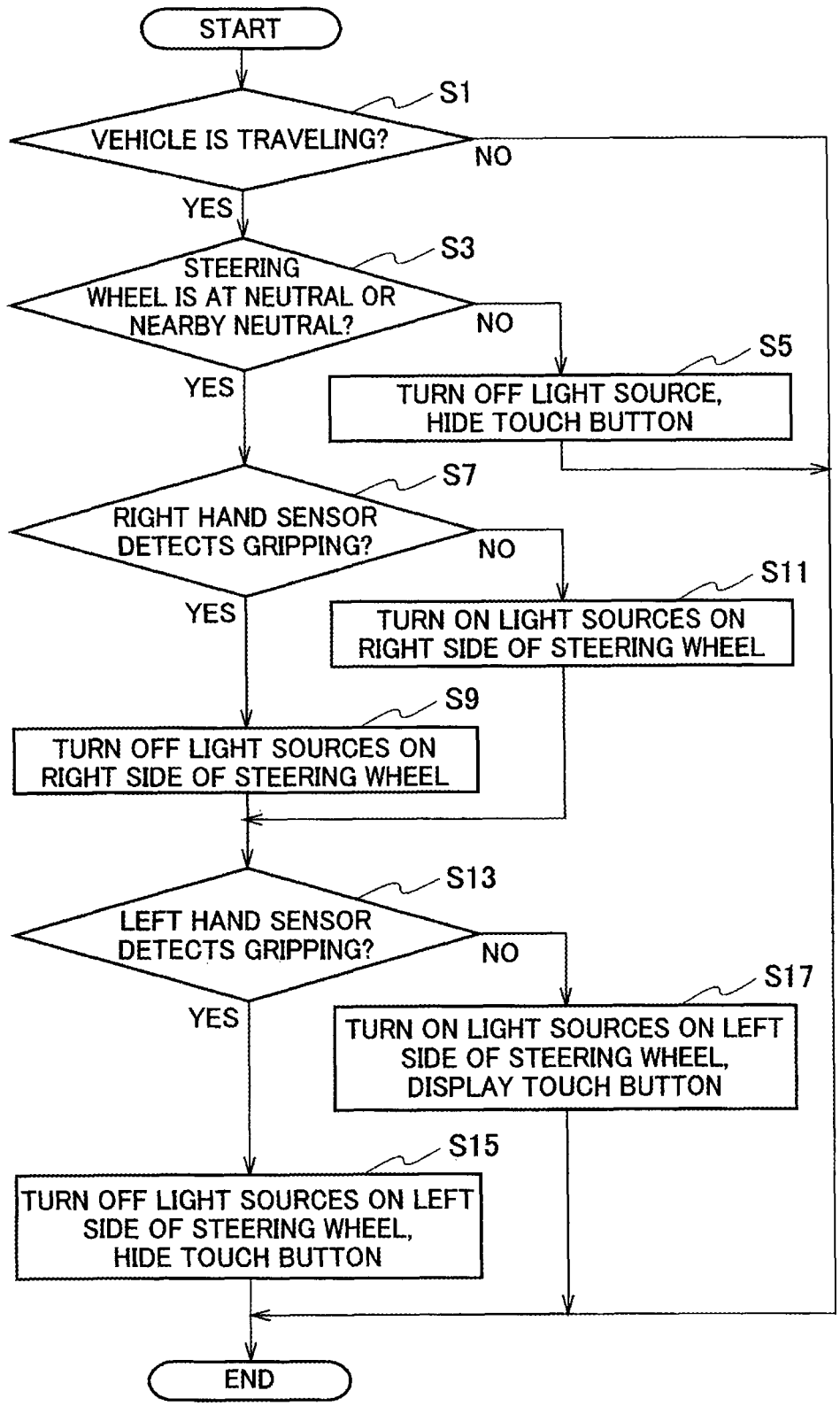
FIG. 3 is a flowchart illustrating a procedure of the lighting control and the display control of the buttons and the like of FIG. 1 executed by a CPU of a controller of FIG. 2 in accordance with a program stored in a ROM.
Figure 4A:
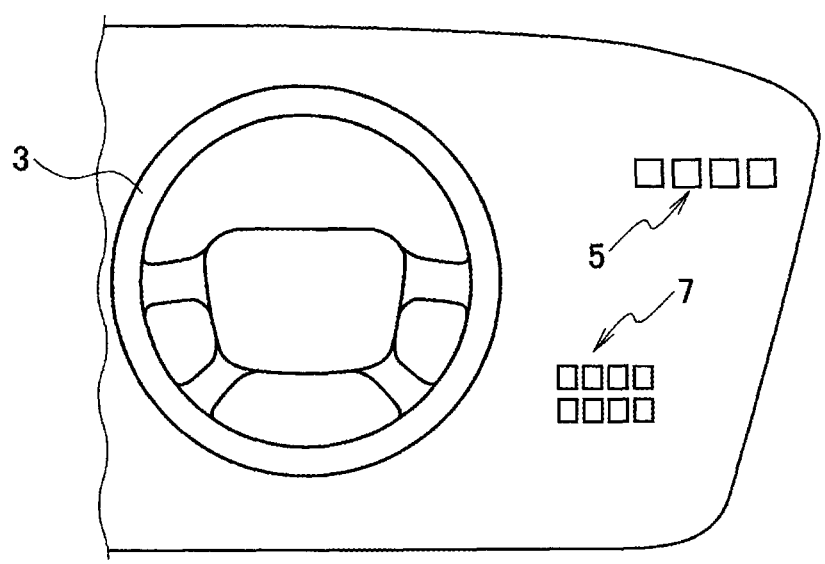
FIG. 4A is an explanatory diagram illustrating a display mode of buttons arranged on the right side of a steering wheel when a right hand sensor of FIG. 2 detects gripping of the steering wheel near a neutral position.
Figure 4B:
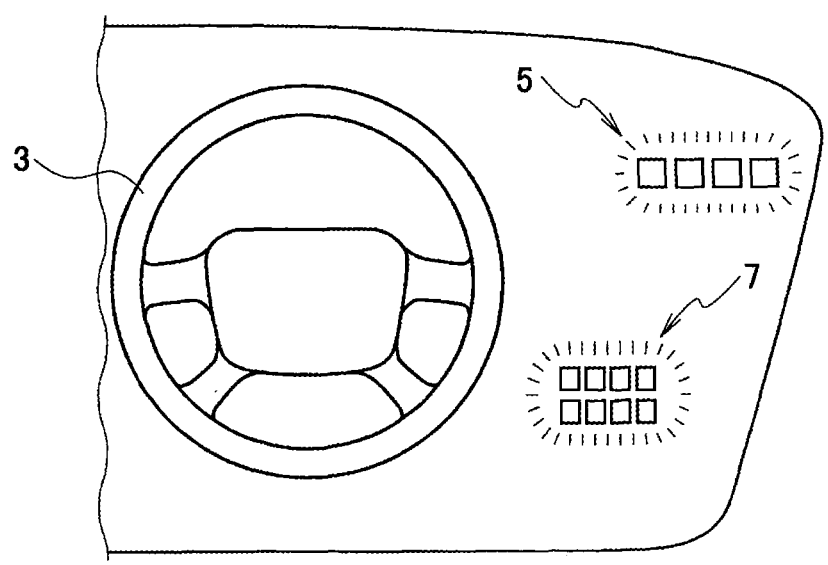
FIG. 4B is an explanatory diagram illustrating a display mode of the buttons arranged on the right side of the steering wheel when the right hand sensor of FIG. 2 does not detect gripping of the steering wheel near the neutral position.
Figure 5A:
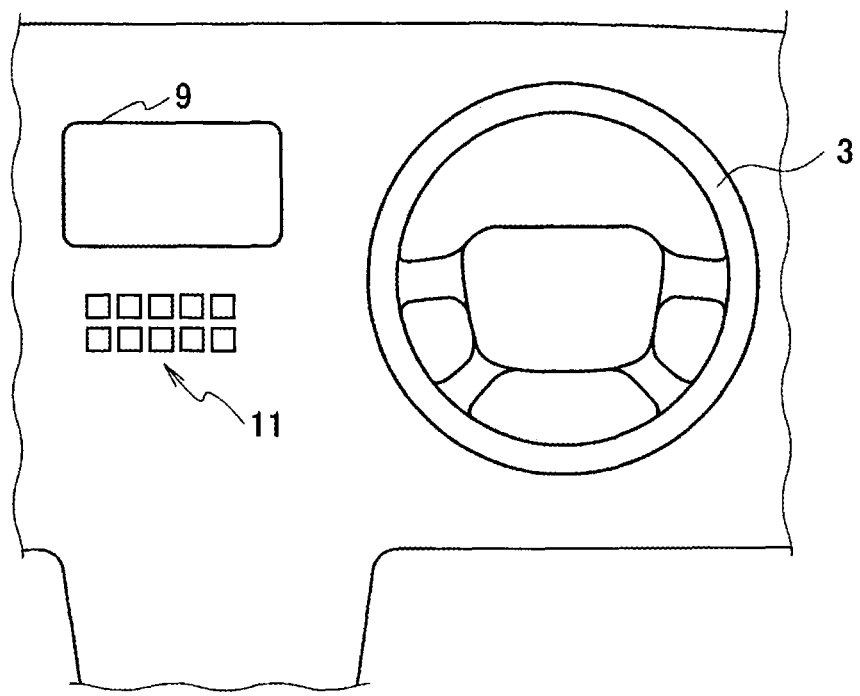
FIG. 5A is an explanatory diagram illustrating a display mode of buttons and the like arranged on the left side of the steering wheel when a left hand sensor of FIG. 2 detects gripping of the steering wheel near the neutral position.
Figure 5B:
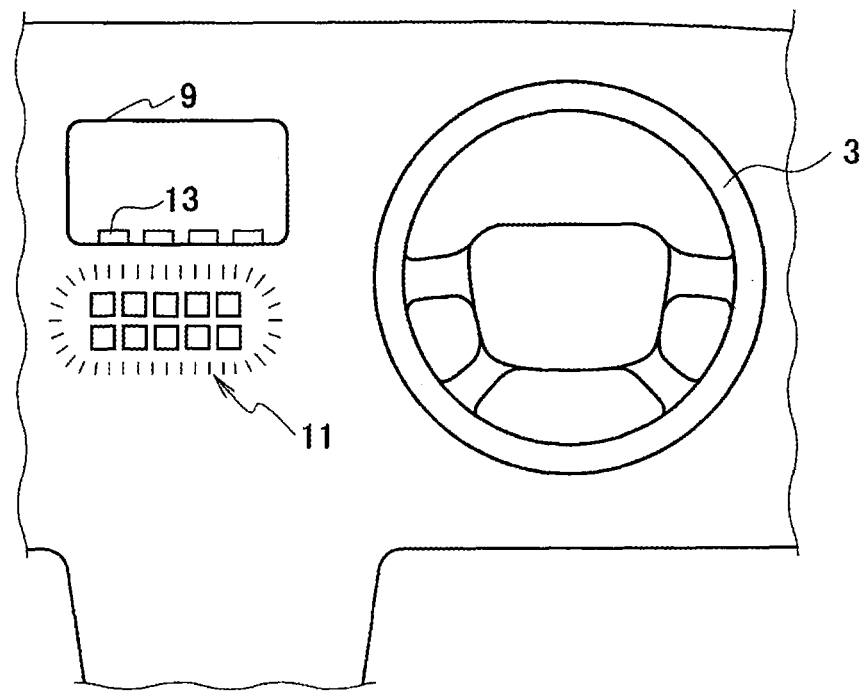
FIG. 5B is an explanatory diagram illustrating a display mode of the buttons and the like arranged on the left side of the steering wheel when the left hand sensor of FIG. 2 does not detect gripping of the steering wheel near the neutral position.

In the embodiment, steps S3, S7, and S13 of the flowchart of FIG. 3 performed by the CPU of the controller 15 function as a detection unit.

In the embodiment, the procedure of steps S9 and S11 of FIG. 3 performed by the CPU of the controller 15 functions as a right hand side control unit, and steps S15 and S17 of FIG. 3 performed by the CPU of the controller 15 function as a left hand side control unit.

Further, in the embodiment, a turning-off state of the light sources 51, 71, 111 of the memory buttons 5, the operation buttons 7, and the air conditioning related buttons 11, and a non-display state of the touch buttons 13 of the touch panel display 9 in steps S9 and S15 of FIG. 3 performed by the CPU of the controller 15 correspond to a first display mode.

In addition, in the embodiment, a turning-on state of the light sources 51, 71, 111 of the memory buttons 5, the operation buttons 7, and the air conditioning related buttons 11, and a display state of the touch buttons 13 of the touch panel display 9 in steps S11 and S17 of FIG. 3 performed by the CPU of the controller 15 correspond to a second display mode.

As described above, in the embodiment, if the right hand sensor 17 detects gripping of the steering wheel 3 when the steering wheel 3 is at the steering angle position of the neutral position or the vicinity of the neutral position, the controller 15 turns off the light sources 51, 71 of the memory buttons 5 and the operation buttons 7.

For this reason, when the right hand of the driver is tied up gripping somewhere in the substantially right half of the steering wheel 3 at the steering angle position of the neutral position or the vicinity of the neutral position, the operation surfaces of the memory buttons 5 and the operation buttons 7 arranged on the right side of the steering wheel 3 are not illuminated by the light sources 51 and 71, and become difficult to be visually recognized.

In addition, in the embodiment, if the left hand sensor 19 detects gripping of the steering wheel 3 when the steering wheel 3 is at the steering angle position of the neutral position or the vicinity of the neutral position, the controller 15 turns off the light source 111 of the air conditioning related buttons 11, and hides the touch buttons 13 of the touch panel display 9.

For this reason, when the left hand of the driver is tied up gripping somewhere in the substantially left half of the steering wheel 3 at the steering angle position of the neutral position or the vicinity of the neutral position, the operation surfaces of the air conditioning related buttons 11 arranged on the left side of the steering wheel 3 are not illuminated by the light source 111, and become difficult to be visually recognized. Further, the touch buttons 13 are not displayed on the touch panel display 9 arranged on the left side of the steering wheel 3, and touch operation to the touch buttons 13 cannot be performed.

On the other hand, in the embodiment, if the right hand sensor 17 does not detect gripping of the steering wheel 3 when the steering wheel 3 is at the steering angle position of the neutral position or the vicinity of the neutral position, the controller 15 turns on the light sources 51, 71 of the memory buttons 5 and the operation buttons 7.

For this reason, when the right hand of the driver is free without gripping anywhere in the substantially right half of the steering wheel 3 at the steering angle position of the neutral position or the vicinity of the neutral position, the operation surfaces of the memory buttons 5 and the operation buttons 7 arranged on the right side of the steering wheel 3 are illuminated by the light sources 51, 71, and become easy to be visually recognized.

In addition, in the embodiment, if the left hand sensor 19 does not detect gripping of the steering wheel 3 when the steering wheel 3 is at the steering angle position of the neutral position or the vicinity of the neutral position, the controller 15 turns on the light source 111 of the air conditioning related buttons 11, and displays the touch buttons 13 on the touch panel display 9.

For this reason, when the left hand of the driver is free without gripping anywhere in the substantially left half of the steering wheel 3 at the steering angle position of the neutral position or the vicinity of the neutral position, the operation surfaces of the air conditioning related buttons 11 arranged on the left side of the steering wheel 3 are illuminated by the light source 111, and become easy to be visually recognized. In addition, the touch buttons 13 are displayed on the touch panel display 9 arranged on the left side of the steering wheel 3, and touch operation can be performed to the touch buttons 13.

That is, when the driver does not operate the steering wheel 3 with the right hand, the memory buttons 5 and the operation buttons 7, which are more easily operated with the right hand, are displayed in a display mode higher in visibility than a display mode of when the driver operates the steering wheel 3 with the right hand. In addition, when the driver does not operate the steering wheel 3 with the left hand, the air conditioning related buttons 11 and the touch buttons 13 of the touch panel display 9, which are more easily operated with the left hand, are displayed in the display mode higher in visibility than the display mode of when the driver operates the steering wheel 3 with the left hand.

Therefore, display modes of the buttons (the memory buttons 5, the operation buttons 7, the air conditioning related buttons 11, the touch buttons 13) operated by the driver of the vehicle for the purpose other than driving can be controlled so that it is easy to distinguish between an operation unit that may be operated by the driver of the vehicle with a hand by which operation is more easily performed and an operation unit that is not so.

In the embodiment, the case has been described of controlling the display modes of the memory buttons 5, the operation buttons 7, the air conditioning related buttons 11, and touch buttons 13, which may be operated by the driver with the hand by which operation is more easily performed, depending on a detection result of the gripping state of the steering wheel 3 by the right hand or the left hand of the driver.

However, a display mode may be controlled of an operation unit that may be operated by the driver for the purpose other than driving with the hand by which operation is more easily performed, depending on an operation state of a driving operation unit operated by the driver for driving the vehicle other than the steering wheel 3, for example, a shift lever and the like.

In addition, in the embodiment, in consideration that the steering wheel 3 is rotated a plurality of times in the case of a right or left turn, turning, or the like, when the steering wheel 3 is steered beyond the steering angle position of the neutral position or the vicinity of the neutral position, the gripping state of the steering wheel 3 by the right hand or the left hand of the driver is not determined based on the detection results of the right hand sensor 17 and the left hand sensor 19.

However, in a case where the driving operation unit is other than the steering wheel 3, it is possible to omit a configuration for preventing determination of the gripping state by the right hand or left hand of the driver depending on the steering angle of the steering wheel 3.

What is claimed is:

1. A vehicle display control device, comprising:
    a detection unit configured to detect an operation state by a driver of a driving operation unit operated by hands of the driver for driving of a vehicle, individually for a right hand and a left hand of the driver;
    a right hand side operation unit arranged on a right side of the driving operation unit and operated with the right hand of the driver for a purpose other than driving of the vehicle;
    a left hand side operation unit arranged on a left side of the driving operation unit and operated with the left hand of the driver for a purpose other than driving of the vehicle; and
    a control unit configured to separately control a display mode of the right hand side operation unit and a display mode of the left hand side operation unit, wherein:
    the control unit is configured to control to
        display the right hand side operation unit in a first display mode when the operation state by the right hand of the driver detected by the detection unit is in an operating state,
        display the right hand side operation unit in a second display mode higher in visibility by the driver than the first display mode when the operation state by the right hand of the driver detected by the detection unit is in a non-operating state,
        display the left hand side operation unit in the first display mode when the operation state by the left hand of the driver detected by the detection unit is in an operating state, and
        display the left hand side operation unit in the second display mode when the operation state by the left hand of the driver detected by the detection unit is in a non-operating state; and
    a steering angle sensor unit is configured to turn at least one of the right hand side operation unit and the left hand side operation unit to the first display mode in response to determining that the driving operation unit is not in a neutral state.

2. The vehicle display control device according to claim 1, wherein
    the detection unit includes a grip sensor for individually detecting a gripping state by the driver of a steering wheel as the driving operation unit at time of not making a right or left turn, at which a steering angle is less than or equal to a predetermined value, by dividing the gripping state into a gripping state of a right hand gripping range by the right hand and a gripping state of a left hand gripping range by the left hand.

3. The vehicle display control device according to claim 1, wherein
    each of the right hand side operation unit and the left hand side operation unit includes a push button to which the driver performs pressing operation, and
    the control unit makes brightness of illumination by a light source on an operation surface of the push button stronger in the second display mode than in the first display mode.

4. The vehicle display control device according to claim 1, wherein
    at least one operation unit of the right hand side operation unit and the left hand side operation unit includes a display button that is selectively displayed on a touch panel and to which the driver performs contact operation during display, and
    the control unit does not display the display button on the touch panel in the first display mode, and displays the display button on the touch panel in the second display mode.

5. The vehicle display control device according to claim 1, wherein
    turning the least one of the right hand side operation unit and the left hand side operation unit to the first display mode, in response to determining that the driving operation unit is not in the neutral state, comprises turning off at least one light source.

6. The vehicle display control device according to claim 1, wherein
    the steering angle sensor unit is configured to turn the at least one of the right hand side operation unit and the left hand side operation unit to the first display mode in response to determining that the driving operation unit is not in the neutral state.

* * * * *